(12) United States Patent
Kim et al.

(10) Patent No.: US 8,964,677 B2
(45) Date of Patent: Feb. 24, 2015

(54) METHOD AND APPARATUS FOR PERFORMING FST TO WHITE SPACE BAND

(75) Inventors: Eunsun Kim, Gyeonggi-do (KR); Yongho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 175 days.

(21) Appl. No.: 13/695,925

(22) PCT Filed: May 4, 2011

(86) PCT No.: PCT/KR2011/003344
§ 371 (c)(1),
(2), (4) Date: Nov. 2, 2012

(87) PCT Pub. No.: WO2011/139094
PCT Pub. Date: Nov. 10, 2011

(65) Prior Publication Data
US 2013/0051353 A1    Feb. 28, 2013

Related U.S. Application Data

(60) Provisional application No. 61/330,903, filed on May 4, 2010, provisional application No. 61/471,705, filed on Apr. 5, 2011.

(51) Int. Cl.
| H04W 36/06 | (2009.01) |
| H04W 16/14 | (2009.01) |
| H04W 72/04 | (2009.01) |
| H04W 92/18 | (2009.01) |

(52) U.S. Cl.
CPC .......... *H04W 16/14* (2013.01); *H04W 72/0406* (2013.01); *H04W 92/18* (2013.01)
USPC ............. 370/329; 370/338; 370/341; 455/62; 455/434; 455/450; 725/62

(58) Field of Classification Search
None
See application file for complete search history.

(56) References Cited

U.S. PATENT DOCUMENTS

| 2007/0238419 A1 | 10/2007 | Dubois et al. |
| 2010/0085921 A1 | 4/2010 | Wu et al. |
| 2010/0229205 A1* | 9/2010 | Hakusui .......................... 725/62 |
| 2010/0246506 A1* | 9/2010 | Krishnaswamy ............. 370/329 |
| 2011/0039554 A1* | 2/2011 | Bims ............................ 455/434 |

FOREIGN PATENT DOCUMENTS

| KR | 10-2006-0055072 A | 5/2006 |
| KR | 10-2009-0109052 A | 10/2009 |

OTHER PUBLICATIONS

International Search Report issued in corresponding International Application No. PCT/KR2011/003344 dated Nov. 30, 2011.

\* cited by examiner

*Primary Examiner* — Chi H Pham
*Assistant Examiner* — Shick Hom
(74) *Attorney, Agent, or Firm* — Morgan, Lewis & Bockius LLP

(57) ABSTRACT

The present invention relates to a method for allowing a station (STA) operable in a plurality of frequency bands to perform a fast session transfer (FST) to a white space band in a wireless local area network (WLAN), and a station device therefore. When an FST is performed, if a band to which mobility is desired through the FST is a white space band, a multi-band element transmitted in an FST request message is suggested to additionally include particular white space information for available channel information acquisition, which is not used by a licensed user in the white space band. Said particular white space information may contain information that indicates whether a target channel is an available channel, and/or performance (apparatus type) in a white space band of a station that requests an FST.

16 Claims, 5 Drawing Sheets

| | STA Role | STA MAC Address present | Pairwise Cipher Suite Present | Channel Availability | Reserved |
|---|---|---|---|---|---|
| Bits: | 3 | 1 | 1 | 1 | 2 |

Multi-band control field in multi-band element format for FST request transmitted by first STA to a second STA,
(wherein if the desired band achieved through the FST is a whitespace band, allowing the multi-band element to further include specific whitespace band information (Channel Availability field) for making the second STA obtain available channel information not used by a licensed device in the whitespace band, and wherein the first STA receives a response message to the FST request message from the second STA, and wherein if a target channel contained in the desired band achieved through the FST is specified as an available channel of the whitespace band, the first STA performs the FST to the target channel)

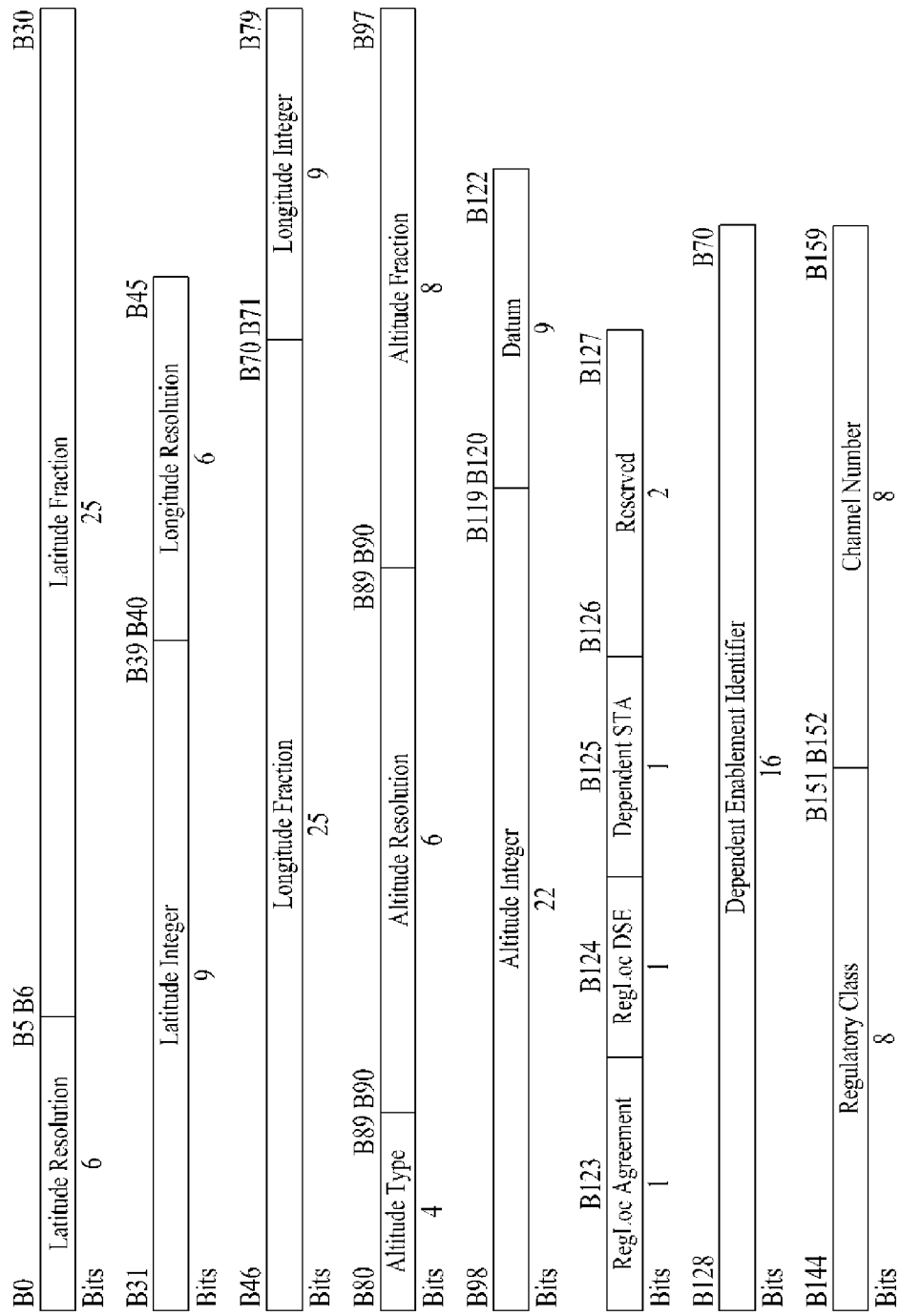

FIG. 4

| Category | Action Value | RequesterSTA Address | ResponderSTA Address | Reason Result Code | Enablement Identifier |
|---|---|---|---|---|---|
| 1 | 1 | 6 | 6 | 1 | 2 |

Octets:

FIG. 5

| Element ID | Length | Multi-band Control | Band ID | Operating Class | Channel Nimber | BSSID | Beacon Interval |
|---|---|---|---|---|---|---|---|
| 1 | 1 | 1 | 1 | 1 | 1 | 6 | 2 |

Octets:

| TFS Offset | Multi-band STA Capability | FSTSessionTimeOut | STA MAC Address (optional) | Pairwise Cipher Suite Count (optional) | Pairwise Cipher Suite List (optional) |
|---|---|---|---|---|---|
| 8 | 1 | 1 | 6 | 2 | 4 x m |

Octets:

FIG. 6

| B0 - B2 | B3 | B4 | B5 - B7 |
|---|---|---|---|
| STA Role | STA MAC Address present | Pairwise Cipher Suite Present | Reserved |

Bits: 3, 1, 1, 3

FIG. 7

|  | STA Role | STA MAC Address present | Pairwise Cipher Suite Present | Channel Availability | Reserved |
|---|---|---|---|---|---|
| Bits: | 3 | 1 | 1 | 1 | 2 |

Multi-band control field in multi-band element format for FST request transmitted by first STA to a second STA,
(wherein if the desired band achieved through the FST is a whitespace band, allowing the multi-band element to further include specific whitespace band information (Channel Availability field) for making the second STA obtain available channel information not used by a licensed device in the whitespace band, and wherein the first STA receives a response message to the FST request message from the second STA, and wherein if a target channel contained in the desired band achieved through the FST is specified as an available channel of the whitespace band, the first STA performs the FST to the target channel)

FIG. 8

| B0 - B2 | B3 | B4 | B5 | B6 - B7 |
|---|---|---|---|---|
| STA Role | STA MAC Address present | Pairwise Cipher Suite Present | WS Capability | Reserved |

Bits: 3, 1, 1, 1, 2

| B0 | B1 | B2 | B3 | B4 | B5 | B6 - B7 |
|---|---|---|---|---|---|---|
| AP | PCP | DLS | TDLS | IBSS | WS Capability | Reserved |

Bits :   3     3     3     3     3     3     3

METHOD AND APPARATUS FOR PERFORMING FST TO WHITE SPACE BAND

TECHNICAL FIELD

The present invention relates to a method for allowing a station (STA) capable of being operated in a plurality of frequency bands in a wireless local area network (WLAN) to perform fast session transfer (FST) to a white space band, and a station (STA) device for the same.

BACKGROUND ART

Standards for WLAN (Wireless Local Area Network) technologies include IEEE 802.11 standards. Among amendments of the IEEE 802.11 standards, IEEE 802.11a/b provide transmission rates of 11 Mbps (IEEE 802.11b) and 54 Mbps (IEEE 802.11a) using an unlicensed band at 2.4 GHz or 5 GHz. IEEE 802.11g provides a transmission rate of 54 Mbps using OFDM at 2.4 GHz. IEEE 802.11n provides a transmission rate of 300 Mbps for 4 spatial streams using MIMO-OFDM (Multiple Input Multiple Output-Orthogonal Frequency Division Multiplexing). IEEE 802.11n supports channel bandwidths of up to 40 MHz and, in this case, provides a transmission rate of 600 Mbps.

On the other hand, IEEE 802.11ad provides a standard for supporting a very high throughput at a band of 60GHz, and provides a Fast Session Transfer (FST) function as one exemplary method for providing the above standard.

Provided that one STA can be operated in a plurality of bands, respective STAs are shifted to other bands as necessary and can be operated in the shifted bands. In this case, the term "band" may be, for example, a band of 2.4 GHz, 5 GHz, 60 GHz or 900 MHz and a TV white space (TVWS) band of 400~700 MHz. However, if there is an additional frequency band in which the IEEE 802.11 system can be used, the corresponding band may also be contained in the scope of the term "band".

For example, if there are STAs capable of supporting the 2.4 GHz and 60 GHz bands, one of STAs being operated in the 2.4 GHz band may be shifted to another band (i.e., the 60 GHz band) so as to provide a higher data transmission/reception rate to other STAs. Specifically, provided that an access point (AP) generates such request and supports two bands, when an STA that has already been associated at 2.4 GHz switches to 60 GHz, the STA need not perform additional association at the corresponding band. Such band switching is referred to as a fast session transfer (FST).

In brief, the term "FST" means, assuming that STAs can be operated in desired frequency band(s), that sessions of STAs are shifted from one channel to another channel within the same or different frequency bands.

However, if an STA capable of supporting multiple bands including a white space (for example, TVWS) requests to switch to a TVWS, the above-mentioned FST must additionally consider some factors. In more detail, the white space band can enable unlicensed devices to perform communication so long as communication of licensed devices is not interrupted in the corresponding band, so that the above-mentioned FST must consider some factors.

DISCLOSURE

Technical Problem

An object of the present invention is to provide a method for allowing a station (STA) capable of being operated in a plurality of frequency bands in a wireless local area network (WLAN) to efficiently perform fast session transfer (FST) to a white space band in consideration of the above-mentioned factors, and a station (STA) device for the same.

Technical Solution

The object of the present invention can be achieved by providing a method for allowing a first station (STA) capable of being operated in a plurality of frequency bands to perform a fast session transfer (FST) to a whitespace band, the method including: transmitting, by the first station (STA), a multi-band element including information used as an FST request message to specify a desired band to which the first STA will move through the FST, to a second station (STA); if the desired band achieved through the FST is a whitespace band, allowing the multi-band element to further include specific whitespace band information for obtaining available channel information not used by a licensed device in the whitespace band, and transmitting the resultant multi-band element; receiving a response message to the FST request message from the second station (STA); and if a target channel contained in the desired band achieved through the FST is specified as an available channel of the whitespace, performing the FST to the target channel.

In another aspect of the present invention, a station (STA) device for performing a fast session transfer (FST) to a whitespace (WS) band includes: a transceiver configured to operate in a plurality of frequency bands; and a processor functionally connected to the transceiver, which transmits, by the transceiver, a multi-band element including information used as an FST request message to specify a desired band to which the first STA will move through the FST, to a second station (STA), if the desired band achieved through the FST is a whitespace band, allows the multi-band element to further include specific whitespace band information for obtaining available channel information not used by a licensed device in the whitespace band, and transmits the resultant multi-band element, receives, by the transceiver, a response message to the FST request message from the second station (STA), and if a target channel contained in the desired band achieved through the FST is specified as an available channel of the whitespace, performs the FST to the target channel.

The information specifying the whitespace band may include information indicating whether the target channel contained in the desired band achieved through the FST is an available channel of the whitespace.

The information specifying the whitespace band may include information indicating a specific function that indicates whether the first station (STA) obtains the available channel information by connecting to a database having the available channel information in the whitespace band.

The information specifying the whitespace band may include information indicating whether the first station (STA) is a first-type device or a second-type device, wherein the first-type device indicates a device that does not request a specific function through which the first-type device obtains the available channel information by connecting to the database, and the second-type device indicates a device that requests a specific function through which the second-type device obtains the available channel information by connecting to the database.

If the first station (STA) is the second-type device, the first station (STA) may allow a target channel field of the multi-band element to be specified as any one of the available channels through the available channel information obtained from the database, and transmit the multi-band element to the second station.

If the first station (STA) is the first-type device, the first station may control a target channel field of the multi-band element to be nullified so that it transmits the multi-band element to the second station. If the second station is the second-type device, the response message may include information regarding the available channel. The response message including the available channel information may be used as an enablement signal.

Advantageous Effects

In accordance with the above-mentioned embodiments, the STA capable of being operated in a plurality of frequency bands in WLAN can efficiently perform FST to a white space band.

DESCRIPTION OF DRAWINGS

The accompanying drawings, which are included to provide a further understanding of the invention, illustrate embodiments of the invention and together with the description serve to explain the principle of the invention.

FIGS. 2 and 3 illustrate a DSE registered location element format prescribed in IEEE 802.11y and a DSE registered location element body field format.

FIG. 4 is a diagram showing a DSE enablement frame format.

FIGS. 5 and 6 are diagrams showing a multi-band element format for requesting a fast session transfer (FST).

FIG. 7 is a diagram showing a multi-band control field to which a channel availability field is added according to one embodiment of the present invention.

FIG. 8 is a diagram showing a multi-band control field to which a white space capability field is added according to one embodiment of the present invention.

BEST MODE

Figure 1:
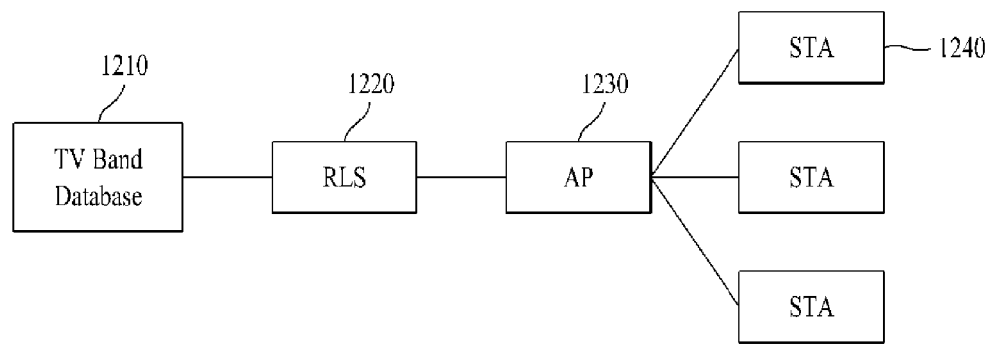
FIG. 1 is a block diagram illustrating a system structure applicable to the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

In some cases, in order to prevent ambiguity of the concepts of the present invention, conventional devices or apparatuses well known to those skilled in the art will be omitted and denoted in the form of a block diagram on the basis of important functions of the present invention. Wherever possible, the same reference numbers will be used throughout the drawings to refer to the same or like parts.

A method for allowing an STA capable of being operated in a plurality of frequency bands in WLAN to efficiently perform a fast session transfer (FST) to a white space band, and a station (STA) device for the same according to embodiments of the present invention will hereinafter be described in detail. To accomplish this, IEEE 802.11af standardization for prescribing a TVWS and WLAN operations in the TVWS will hereinafter be described as an example of a whitespace band.

IEEE 802.11af standards regulate WLAN operation of an unlicensed device in a TV whitespace (TVWS) zone.

TV whitespace (referred to as 'TVWS' hereinafter) is a frequency allocated to broadcast TV and can include UHF and VHF bands. While the TVWS can include 54 MHz to 698 MHz (US and Korea), parts of these frequency bands may not be used for unlicensed devices in some countries.

In a frequency band, an STA operating as an unlicensed device can use an available channel that is not used by a licensed device (which may be referred to as 'incumbent user' or 'primary user'). Accordingly, it is important for an STA that needs to use TVWS to acquire information about an available channel that is not used by a licensed device. To achieve this, the STA can perform spectrum sensing at the location thereof so as to obtain information on the available channel, or can perform measurement for detecting the primary user signal.

Unlicensed devices using TVWS need to provide a protection function for operations of licensed devices. That is, when an incumbent user such as a microphone uses a specific band used by an STA, the STA needs to stop using a channel corresponding to the band in order to protect the incumbent user.

To this end, STAs may require a frequency sensing mechanism. An energy detection scheme, a signature detection scheme and the like can be used as the frequency sensing mechanism. An STA can determine that a band is being used by an incumbent user if the intensity of a received signal exceeds a predetermined value, or when a DTV preamble is detected.

However, as described above, if an STA that operates as the unlicensed device in a TVWS depends only upon frequency sensing to obtain available channel information, load caused by the sensing of a TVWS operation of the STA is excessively increased and a necessary procedure may be delayed. STA sensing information may have the probability error such as false alarm, misdetection, and the like, so that more precise information is requested according to location information. Therefore, the embodiment of the present invention provides a mechanism for allowing an STA operating as an unlicensed device in TVWS to obtain information regarding an available channel from a database (DB) on the basis of location information, and efficiently utilizing the sensing/measurement result for detecting a primary signal so that update of database information, reporting of the measurement result, and reporting at a Dynamic Station Enablement (DSE) procedure can be performed.

FIG. 1 is a block diagram illustrating a system structure applicable to the present invention.

An IEEE 802.11 TVWS STA is an unlicensed device that operates using an IEEE 802.11 MAC layer and PHY layer in a TVWS frequency band. STAs operating in a TVWS frequency band may be classified according to roles thereof into an STA 1230 operating as an AP (Access Point) and STAs 1240 provided with a service by the specific AP 1230.

The following embodiments of the present invention will be described on the assumption that the STAs 1230 and 1240 operating as unlicensed devices in TVWS use database information having available channel data according to regional locations thereof in order to acquire information on available channels.

A database 1210, for example, a TV band database may have information on available channels in a TV band. This database information includes location-based information accurate to about 50 m, in general. An RLS (Registered Location Server) 1220 may be a server including information on registered locations of all APs operating in TVWS. While FIG. 1 illustrates the TV band database 1210 and the RLS 1220 as separate devices, they may be implemented as one TV band database device.

If an STA operating as an unlicensed device in TVWS needs to operate as an AP, the STA should register the location thereof in the RLS 1220. The AP 1230 can acquire available channel information of the database according to registrations. Then, the AP 1230 can provide the database information to the STAs 1240 that belong thereto.

If an unlicensed device operates in a licensed band such as a TV white space (TVWS), two modes for STA are generally defined. That is, STAs can be classified into an enabling STA and a dependent STA.

The enabling STA can enable other dependent STAs. Although the enabling STA does not receive the enabling signal, it can transmit signals and initiate a network. In contrast, the dependent STA is configured to transmit signals only when receiving the enabling signal, and it can be operated under control of the enabling STA. On the other hand, an STA capable of transmitting the enabling signal includes not only the enabling STA but also the dependent AP STA. The dependent STA can be enabled by either the enabling STA or the dependent AP STA.

Figure 2:
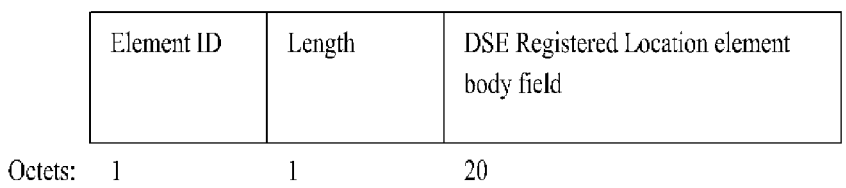

FIGS. 2 and 3 illustrate a DSE registered location element format prescribed in IEEE 802.11y and a DSE registered location element body field format.

IEEE 802.11y standard has been designed to operate one or more unlicensed devices at 3.5 GHz. IEEE 802.11y includes the above-mentioned enabling procedure, and an associated procedure is referred to as a dynamic STA enablement (DSE). In accordance with IEEE 802.11y, the enabling STA can transmit a DSE registered location element in which a RegLoc DSE bit is set to 1 as an enablement signal. The DSE registered location element format is shown in FIG. 2, and the DSE registered location element body field format is shown in FIG. 3.

The corresponding element is transmitted to a beacon or a probe response frame. If a dependent STA receives and decodes the above element, the dependent STA transmits an enablement request frame for a channel indicated by the corresponding element. Thereafter, if the dependent STA receives an enablement response frame, the enablement procedure of the corresponding STA is completed. If the enabling STA enables the dependent STA through the above-mentioned procedure, the corresponding dependent STA is enabled.

FIG. 4 is a diagram showing a DSE enablement frame format.

Referring to FIG. 4, the enabling STA transmits a DSE enablement frame when enabling the dependent STA. In this case, a dependent enablement identifier of 16 bits is allocated for the corresponding dependent STA as shown in FIG. 7. The enablement identifier is used to allocate a unique ID among STAs enabled by the corresponding enabling STA. If a DSE enablement frame is not transmitted by the enabling STA, the enablement identifier may be set to zero '0' so that the enablement identifier of 0 is transmitted.

On the other hand, the DSE enablement frame may be used as an enablement request frame or an enablement response frame according to reason result codes. The reason result codes have been defined to have the following values as shown in Table 1.

TABLE 1

| Reason Result Code field value | Description |
|---|---|
| 0 | Reserved |
| 1 | Reserved |
| 2 | Enablement requested |
| 3 | Success |
| 4 | Request declined |
| 5 | Request not successful as one or more parameters have invalid values |
| 6 | Enablement denied because the enabling STA is unable to handle additional dependent STAs |
| 7 | Handshake timeout |
| 8-255 | Reserved |

A method for allowing a station (STA) to perform efficient FST to a white space using the above-mentioned whitespace characteristics will hereinafter be described in detail.

FIGS. 5 and 6 are diagrams showing a multi-band element format for requesting a fast session transfer (FST).

For FST, each STA can transmit a multi-band element including information shown in FIGS. 5 and 6 to a counterpart STA of the FST through an FST request frame. A multi-band element can allow the STA transmitting this multi-band element to be operated in a transfer channel of the multi-band element and an operating class, and can allow the STA to be operated even in a channel different from the frequency band, an operating class, and a frequency band. It should be noted that the STA configured to transmit such element can perform session transfer to another channel of the same or different band.

In more detail, FIG. 5 shows a multi-band element format for FST request, and FIG. 6 shows a multi-band control field from among multi-band elements shown in FIG. 5.

Referring to the multi-band control field shown in FIG. 6, "STA Role" may specify either an operating class indicated by the STA configured to transmit the element within the above-mentioned element or a role to be performed on a channel of a regulatory class. The STA Role field values are shown in the following Table 2.

TABLE 2

| STA role | Value |
|---|---|
| AP | 0 |
| TDLS STA | 1 |
| IBSS STA | 2 |
| PCP | 3 |
| Non-PCP Non-AP STA | 4 |
| Reserved | 5-7 |

For example, if the STA Role field indicates an IBSS STA, a BSSID field of FIG. 5 may indicate a BSSID of the corresponding IBSS.

"STA MAC Address present" field may indicate whether the STA MAC Address field is present in the multi-band element, "Pairwise Cipher Suit Present" field may indicate whether the multi-band element includes "Pairwise Cipher Suite Count" field and "Pairwise Cipher Suite List" field. In addition, FIG. 6 shows a 3-bit reserved region present in the multi-band control field.

A Band ID field from among the multi-band elements shown in FIG. 5 may indicate a frequency band associated with both the operating class and channel number fields. Although a band capable of being used in the present invention may be indicated as shown in the following Table 3, it should be noted that the band may further include an additional band as necessary.

TABLE 3

| Band ID value | Meaning |
| --- | --- |
| 0 | TV white spaces |
| 1 | Sub-1 GHz |
| 2 | 2.4 GHz |
| 3 | 3.6 GHz |
| 4 | 5 GHz |
| 5 | 60 GHz |
| 6-255 | Reserved |

The operating class field (or regulatory class) indicates a combination of channels to which the multi-band element is to be applied. That is, a country field, an operating class field, and a channel number field may simultaneously specify a channel frequency and frequency spacing to which the multi-band element is to be applied.

The multi-band STA capability field may be denoted by the following Table 4.

TABLE 4

|  | AP | PCP | DLS | TDLS | IBSS | Reserved |
| --- | --- | --- | --- | --- | --- | --- |
| Bits: | B0 | B1 | B2 | B3 | B4 | B5-B7 |

The multi-band STA capability field may indicate connection capability supported by an STA on a channel and band indicated by the multi-band element. That is, if the multi-band STA capability field is set to a bit '0', this means that the STA has an AP capability. If the multi-band STA capability field is set to a bit '1', this means the STA has a PCP capability.

The above-mentioned multi-band element may be contained in a beacon frame, an association request/response frame, a probe request/response frame, a fast session transfer request/response frame, etc. so that the resultant multi-band element can be transmitted to a destination. The STA configured to transmit the multi-band element may designate its own capability information, a desired target band, an operating class for use in the corresponding band, and a channel number thereof, and then transmit data using the designated information.

Differently from other conventional ISM/Public safety bands, some additional factors must be considered to perform FST to a white space band wherein only the operation of an available channel in which the STA is not used by the primary user is allowed. Accordingly, the embodiments of the present invention will disclose specific whitespace information to be additionally contained in the aforementioned multi-band element so as to allow an STA to perform FST to a whitespace band, and will also disclose which format of the specific whitespace information is to be contained in the specific whitespace information. In addition, a method and apparatus for performing FST according to a detailed format of specific whitespace information will hereinafter be described in detail.

Addition of Channel Availability Field

If the STA performs FST to a whitespace (WS) band according to one embodiment of the present invention, a channel availability field is added to a control field of the multi-band element so that the resultant control field indicates whether a channel indicated by the multi-band element is an available channel of the whitespace zone in such a manner that FST can be substantially carried out.

For example, in case of a TVWS band, provided that a traffic channel is shifted to a TVWS band of a different band due to TVWS operation characteristics, a channel cannot be used in the TVWS band under the condition that channel availability has not been investigated. That is, although the STA requests an FST having used the multi-ban element, substantial FST may not be achieved.

Therefore, the embodiment of the present invention provides a method for adding a channel availability field, that serves as a field unique for the WS band and indicates channel availability indicated by the multi-band element, to the multi-band control field.

FIG. 7 is a diagram showing a multi-band control field to which a channel availability field is added according to one embodiment of the present invention.

A WS specific field may indicate whether the STA has investigated channel availability in the corresponding channel so as to protect the primary user signal. In other words, this embodiment provides a method for defining a field indicating whether the corresponding channel can be immediately utilized. Although the corresponding field does not belong to a TVWS band, provided that an STA performs monitoring or enters a standby mode before employing a channel in a specific band through regulation or other reasons, namely, provided that the STA has difficulty in immediately utilizing the channel, the above-mentioned field may indicate a specific value as to whether the STA can immediately utilize the channel without consuming a standby time.

The STA according to this embodiment can transmit an FST request frame including the multi-band control field shown in FIG. 7 to the counterpart STA. If the STA transmits the FST request frame in which a channel availability bit of the multi-band control field has a true value, the STA/AP having received the FST request frame may accept the corresponding request. Therefore, traffic data for use in a different band can be immediately shifted to a specific channel of the WS band indicated by the multi-band element.

If the STA transmits an FST request frame in which the channel availability bit of the multi-band control field has a false value, the STA/AP having received the FST request frame may deny the corresponding request.

The multi-band element according to this embodiment may be contained in a beacon frame, probe request/response frames, association/re-association request/response frames, and other announcement frames. If the STA receives a frame in which the channel availability bit of the multi-band control field has a true value, this indicates that the STA having transmitted the corresponding element has completely finished channel availability investigation, and the STA having received the channel availability investigation result can immediately perform traffic switching and signal transmission to a channel of the corresponding whitespace (WS) band. The operations of this embodiment can be applied not only to non-AP STA but also to AP STA.

Addition of Device Type Information

In accordance with this embodiment of the present invention, if the STA performs FST to a whitespace (WS) band, a specific field (indicating whether the STA can access a database having available channel information in the WS band) indicating a device type of the STA configured to transmit the FST request frame is added to the multi-band element. In addition, the above-mentioned embodiment obtains available channel information according to a device type of the STA configured to transmit the FST request frame so that FST to an available channel of the WS band can be performed.

In order to operate the unlicensed device in the whitespace zone, the unlicensed device is controlled by a geo-location database. A specific STA type can be identified according to identification capability of the STA location. In other words, the specific STA type can be identified according to whether the STA has geo-location capability and is able to access the geo-location database over the Internet.

In more detail, while a specific device type STA requests the above-mentioned database access capability, a different device type STA may not request the above-mentioned database access capability. For convenience of description and better understanding of the present invention, a plurality of terms prescribed in FCC will hereinafter be used without change.

Unlicensed devices operated in TVWS can be largely classified into fixed devices and personal/portable devices. The personal/portable devices can be classified into a Mode I device and a Mode II device. The mode II device has geo-location capability and Internet access capability. The mode II device gains access to a database and obtains available channel information from its own location, so that the mode II device can operate in the TVWS belonging to the corresponding location. The mode II device may configure a Basic Service Set (BSS) and the like through the above-mentioned operations.

On the other hand, the mode I device does not have either its own location confirmation capability or a database access capability. However, the mode I device gains access to a database and needs to be controlled by the mode II device or fixed device having valid available channel information. The fixed device connects to a database at a fixed location and is operated by obtaining available channel information from the database. The above-mentioned fixed device may provide necessary services to the above personal/portable devices.

Considering the above-mentioned characteristics, when the STA operating in the remaining bands other than the TVWS attempts to perform FST to the TVWS according to this embodiment of the present invention, or when the STA performs signaling of its own capability for the TVWS, the embodiment of the present invention can indicate whether the STA supports the TVWS, and can indicate capability of the STA operating in the TVWS. That is, the embodiment of the present invention can signal geo-location capability and database access capability in consideration of the above-mentioned characteristics. In brief, the embodiment of the present invention provides a method for signaling not only a role of the corresponding STA in TVWS but also device type information. The above-mentioned information may be added to the above-mentioned multi-band element as specific whitespace information.

A variety of embodiments for the case in which the above-mentioned specific whitespace (WS) information is contained in the multi-band element will hereinafter be described in detail. First of all, an exemplary case for utilizing the multi-band control field will hereinafter be described in detail.

First Embodiment—Utilization of STA Role Field

A first embodiment provides a method for utilizing the STA Role field of the multi-band control field shown in Table 2. In more detail, the STA Role filed may be configured as shown in the following Table 5.

TABLE 5

| STA Role | Value |
|---|---|
| AP | 0 |
| TDLS STA | 1 |
| IBSS STA | 2 |
| PCP | 3 |
| Non-PCP Non-AP STA | 4 |
| Mode I STA | 5 |
| Mode II STA or Fixed STA | 6 |
| Reserved | 7 |

As described above, the STA Role field indicates how the STA transmitting the corresponding element is operated at the operating class and channel number indicated by the multi-band element, so that the STA Role field can indicate how an STA configured to transmit the above element using three reserved values of the STA Role field is operated in the corresponding WS band. In more detail, the STA Role field values 5 and 6 of Table 5 can indicate a Mode I STA and a Mode II/Fixed STA, respectively, so that STA capability can be signaled in TVWS.

Second Embodiment—Use of Reserved Bits of Multi-Band Control Field

FIG. 8 is a diagram showing a multi-band control field to which a whitespace (WS) capability field is added according to one embodiment of the present invention.

Compared to the multi-band element shown in FIG. 6, it can be readily recognized that the multi-band control field shown in FIG. 8 further includes a WS capability field using a reserved bit of the multi-band control field. As a result, if the WS capability field value is set to zero '0', this means that the STA transmitting this element is used as the Mode I device. If the WS capability field value is set to '1', this means that the STA transmitting this element is used as the mode II device or the fixed STA.

A method for utilizing the multi-band STA capability field contained in the multi-band element will hereinafter be described in detail.

Third Embodiment—Use of Multi-Band STA Capability Field of Multi-Band Element

A third embodiment proposes a method for adding device type information to the multi-band STA capability field of the multi-band element. The multi-band STA capability field may indicate the corresponding STA capability for use in the band and channel indicated by the multi-band element, as previously stated in Table 4. In accordance with this embodiment of the present invention, the device type information is added to the multi-band STA capability field of the multi-band element of Table 4, so that the field value shown in FIG. 9 may be assigned to the resultant multi-band STA capability field.

In more detail, the WS capability bit is added to the field value of the multi-band STA capability field. If the WS capability bit has a value of 0, this means the mode I. If the WS capability bit has a value of 1, this means the mode II/fixed STA.

Method for Performing FST when Device Type Information is Added

A method for allowing an STA to perform FST when device type information is added as specific WS information to the multi-band element will hereinafter be described in detail.

Provided that a specific STA attempts to perform signaling of TVWS capability through the multi-band element or attempts to perform FST to a TVWS through the multi-band element, if the specific STA is the mode II or fixed device or has capability equivalent to that of the mode II or fixed device, the STA may preferably obtain available channel information from its own location by connecting to a database and may preferably provide the multi-band element with specific information indicating the STA capable of being used as the mode II device. In association with a desired target operation class/channel number, it is preferable that target channel information from among available channels be combined and transmitted on the basis of the available channel information received from the database.

On the other hand, assuming that the STA configured to transmit the multi-band element is operated as the mode I device in TVWS, the band ID is established as TVWS, and the operating class field and the channel number field are nullified and transmitted. Alternatively, assuming that the band ID is established as TVWS and TVWS capability of the corresponding STA can support only the mode I, the operating class and the channel number field may be omitted because the corresponding STA is unable to recognize available channel information without accessing the database.

In association with the multi-band element transmitted from the mode I device, if the STA having received the multi-band element is used as the mode II device, the mode II device may obtain available channel information by connecting to the database, and may respond to the aforementioned FST request using its own capability and target channel information.

On the other hand, in accordance with one embodiment of the present invention, the multi-band element based on the above-mentioned available channel information transmitted from the mode II device may be interpreted as the enabling signal in TVWS. That is, the STA having received the enablement signal may be operated in the corresponding band. Thereafter, the STA receives the enablement response frame by transmitting the enablement request frame, so that it can be normally operated. In this case, the STA may transmit either the enablement request frame or the channel availability query request frame requesting available channel information of the whitespace. In this case, the STA may transmit the enablement request frame and the channel availability query request frame to a channel indicated by the operating class and channel number of the multi-band element, and may receive the enablement response frame or the channel availability query response frame to the corresponding channel.

The STA that specially desires to perform FST may transmit an FST setup request frame. In this case, the STA may further include the multi-band element in the FST setup request frame, and transmit the resultant FST setup request frame. The mode II device according to this embodiment receives available channel information by connecting to the database, includes calculated target channel information in the multi-band element, and transmits the FST setup request frame along with its own capability information. When the mode I device transmits the FST setup request frame, assuming that a peer STA of the corresponding request frame is the Mode I device, the peer STA may transmit a frame (Fast Session Transfer Tear down frame) configured to reject the corresponding FST setup request.

Although the above-mentioned example has been disclosed using a TVWS as an example of the whitespace (WS) band, the whitespace (WS) of the present invention may conceptually include not only a band allocated to a TV broadcast of UHF and VHF bands, but also a band allowed by an unlicensed device capable of using a time/band not used by the primary user in a specific band including the primary user. In more detail, the whitespace of the present invention can enable a plurality of STAs to obtain primary user information from a database, so that the unlicensed device is controlled by the database within the whitespace zone.

Configuration of Apparatus

Figures 9, 10:
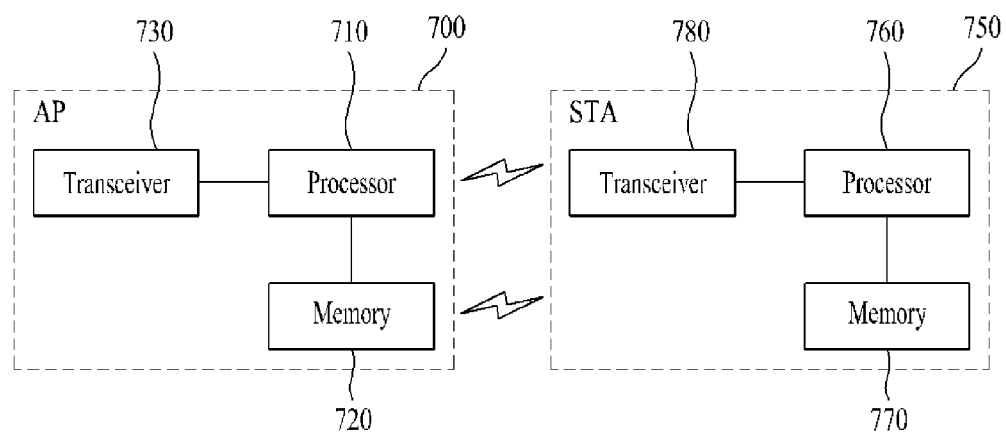
FIG. 9 is a diagram showing a device type field added to a multi-band STA capability field of a multi-band element according to one embodiment of the present invention.
FIG. 10 is a block diagram illustrating an access point (AP) device and a station (STA) device according to an embodiment of the present invention.

FIG. 10 is a block diagram illustrating an AP device and an STA device according to an embodiment of the present invention.

Referring to FIG. 10, the AP 700 and STA 750 include transceivers 730 and 780, processors 710 and 760, and optionally memories 720 and 770, respectively. In the WLAN system shown in FIG. 1, the database and/or RLS may have a configuration similar to the configuration shown in FIG. 1.

An AP 700 or STA 750 operating as the unlicensed device allowed in an available channel that is not used by the licensed device of a whitespace band will hereinafter be described in detail. The AP 700 or STA 750 includes the transceiver 730 or 780 capable of being operated in a plurality of frequency bands, and the processor 710 or 760 functionally connected to the transceivers 730 or 780, respectively. The processor 710 or 760 may transmit the multi-band element that serves an FST request message and includes information specifying a desired band, to the counterpart STA through the FST. If the desired band to which the STA will move through FST is a whitespace (WS) band, the processor 710 or 760 may control the multi-band element to further include specific WS band information for obtaining available channel information not used by the licensed device in the whitespace band, so that it can transmit the resultant multi-band element to a destination. In addition, the transceiver 730 or 780 receives a response message to the FST request message from the counterpart STA. If a target channel contained in a desired band to which the STA will move through FST is used as an available channel, the processor 710 or 760 may perform FST to the target channel.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

[Industrial Applicability]

Although the above-mentioned embodiments have been disclosed on the basis of the IEEE 802.11 based system for convenience of description, the scope or spirit of the present invention is not limited thereto. That is, the above-mentioned embodiments can also be applied to various mobile communication systems capable of being driven when the unlicensed device obtains available channel information according to the same principles as those of the IEEE 802.11 based system.

The invention claimed is:

1. A method for allowing a first station (STA) capable of being operated in a plurality of frequency bands to perform a fast session transfer (FST) to a whitespace band, the method comprising:

transmitting, by the first station (STA), a multi-band element including information used as an FST request message to specify a desired band to which the first STA will move through the FST, to a second station (STA);

if the desired band achieved through the FST is a whitespace band, allowing the multi-band element to further include specific whitespace band information for making the second station (STA) obtain available channel information not used by a licensed device in the whitespace band, and receiving a response message to the FST request message from the second station (STA); and if a target channel contained in the desired band achieved through the FST is specified as an available channel of the whitespace band, performing the FST to the target channel.

2. The method according to claim 1, wherein the information specifying the whitespace band includes information indicating whether the target channel contained in the desired band achieved through the FST is the available channel of the whitespace band.

3. The method according to claim 1, wherein the information specifying the whitespace band includes information indicating a specific function that indicates whether the first station (STA) obtains the available channel information by connecting to a database having the available channel information in the whitespace band.

4. The method according to claim 3, wherein:
the information specifying the whitespace band includes information indicating whether the first station (STA) is a first-type device or a second-type device;
the first-type device indicates a device that does not request a specific function through which the first-type device obtains the available channel information by connecting to the database; and
the second-type device indicates a device that requests a specific function through which the second-type device obtains the available channel information by connecting to the database.

5. The method according to claim 4, wherein, if the first station (STA) is the second-type device, the first station (STA) allows a target channel field of the multi-band element to be specified as any one of the available channels through the available channel information obtained from the database, and transmits the multi-band element to the second station.

6. The method according to claim 4, wherein, if the first station (STA) is the first-type device, the first station (STA) controls a target channel field of the multi-band element to be nullified so that it transmits the multi-band element to the second station.

7. The method according to claim 6, wherein, if the second station is the second-type device, the response message includes information regarding the available channel.

8. The method according to claim 7, wherein the response message including the available channel information is used as an enablement signal.

9. A station (STA) device for performing a fast session transfer (FST) to a whitespace (WS) band, the station (STA) comprising:
a transceiver configured to operate in a plurality of frequency bands; and
a processor functionally connected to the transceiver, which transmits, by the transceiver, a multi-band element including information used as an FST request message to specify a desired band to which the first STA will move through the FST, to a second station (STA), if the desired band achieved through the FST is a whitespace band, allows the multi-band element to further include specific whitespace band information for making the second station (STA) obtain available channel information not used by a licensed device in the whitespace band, and receives, by the transceiver, a response message to the FST request message from the second station (STA), and if a target channel contained in the desired band achieved through the FST is specified as an available channel of the whitespace band, performs the FST to the target channel.

10. The station device according to claim 9, wherein the information specifying the whitespace band includes information indicating whether the target channel contained in the desired band achieved through the FST is the available channel of the whitespace band.

11. The station device according to claim 9, wherein the information specifying the whitespace band includes information indicating a specific function that indicates whether the station (STA) obtains the available channel information by connecting to a database having the available channel information in the whitespace band.

12. The station device according to claim 11, wherein:
the information specifying the whitespace band includes information indicating whether the station (STA) device is a first-type device or a second-type device;
the first-type device indicates a device that does not request a specific function through which the first-type device obtains the available channel information by connecting to the database; and
the second-type device indicates a device that requests a specific function through which the second-type device obtains the available channel information by connecting to the database.

13. The station device according to claim 12, wherein, if the station (STA) device is the second-type device, the processor allows a target channel field of the multi-band element to be specified as any one of the available channels through the available channel information obtained from the database, and transmits the multi-band element to the second station.

14. The station device according to claim 12, wherein, if the station (STA) device is the first-type device, the processor controls a target channel field of the multi-band element to be nullified so that it transmits the multi-band element to the second station.

15. The station device according to claim 14, wherein, if the second station is the second-type device, the response message includes information regarding the available channel.

16. The station device according to claim 15, wherein the response message including the available channel information is used as an enablement signal.

* * * * *